United States Patent [19]
Woodworth et al.

[11] 3,742,812
[45] July 3, 1973

[54] METHOD OF AIMING A TELEVISION GUIDED MISSILE

[75] Inventors: William H. Woodworth; Robert D. Cunningham, both of China Lake, Calif.

[73] Assignee: The United States of America as represented by the Secretary of the Navy, Washington, D.C.

[22] Filed: Mar. 28, 1969

[21] Appl. No.: 812,566

[52] U.S. Cl............ 89/1.5 E, 33/230, 178/DIG. 20
[51] Int. Cl................................................. B64d 1/04
[58] Field of Search...................... 89/1.5; 244/3.11, 244/3.14; 33/46.5, 23 C; 178/DIG. 20

[56] References Cited
UNITED STATES PATENTS

| | | | |
|---|---|---|---|
| 2,955,356 | 10/1960 | Wheeler et al..................... | 89/15 E |
| 2,959,375 | 11/1960 | Dunnegan, Jr..................... | 244/3.14 |
| 3,337,161 | 8/1967 | Halton.............................. | 244/3.14 |
| 3,415,465 | 12/1968 | Bedford............................ | 244/3.14 |

*Primary Examiner*—Samuel W. Engle
*Attorney*—Edgar J. Brower and Roy Miller

[57] ABSTRACT

A method of aiming a gyrostabilized television guided missile system from the air at a ground target wherein the missile is boresighted prior to launch. At launch time the pilot places the desired target within the gunsight of his aircraft, confirms in his cockpit monitor that the target is indeed within the tracking gate of the missile, then launches the missile.

2 Claims, 3 Drawing Figures

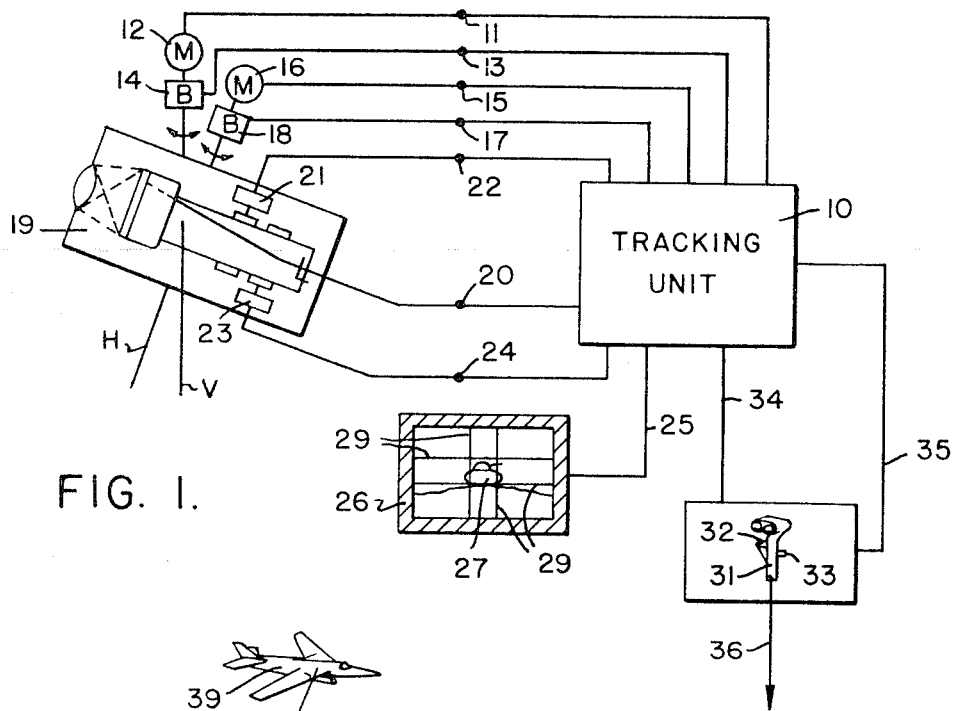
FIG. 1.
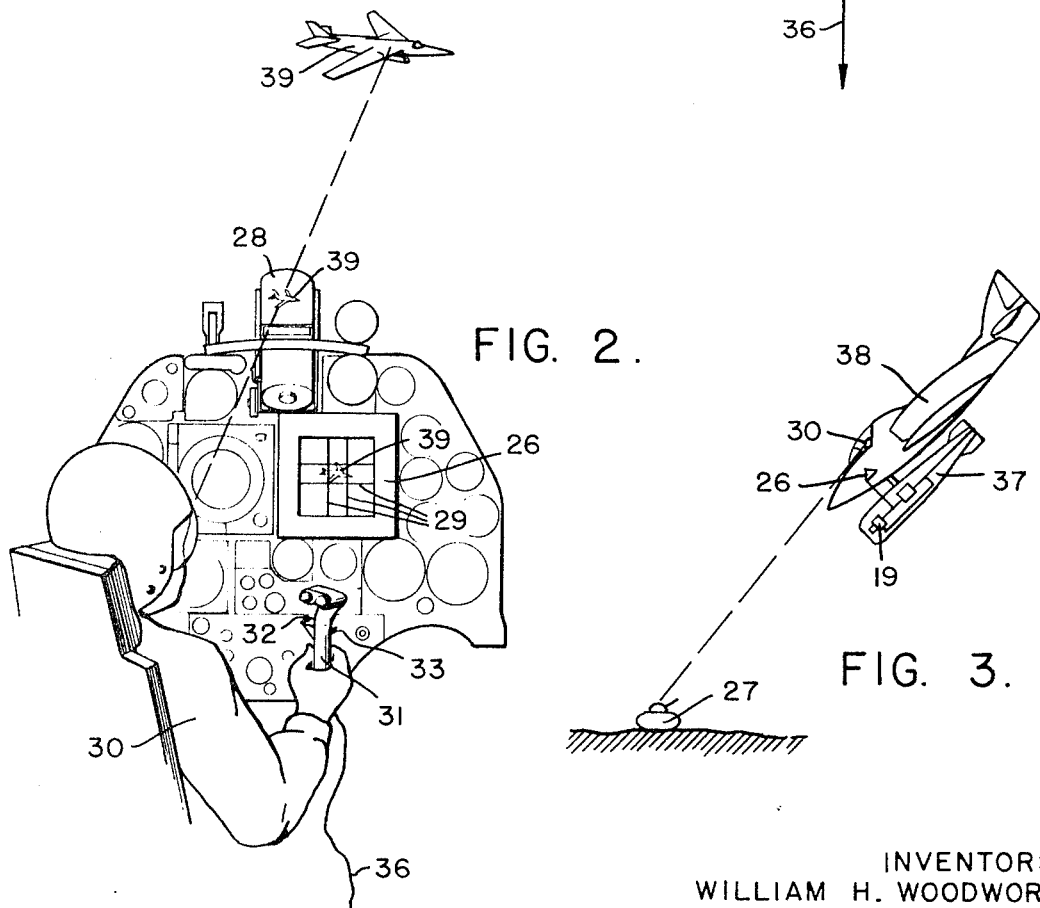
FIG. 2.
FIG. 3.
INVENTORS.
WILLIAM H. WOODWORTH
ROBERT D. CUNNINGHAM
BY
ROY MILLER
ATTORNEY.

METHOD OF AIMING A TELEVISION GUIDED MISSILE

GOVERNMENT INTEREST

The invention described herein may be manufactured and used by or for the Government of the United States of America for governmental purposes without the payment of any royalties thereon or therefor.

BACKGROUND OF THE INVENTION

Experience has shown that television guided missiles not equipped with caging means for their gyros may not retain their boresight if they are boresighted prior to launch. Lack of a true boresight could increase the exposure time of an aircraft to enemy fire or could cause an aborted run which would double the time of the aircraft over the target.

For an example of a television tracking system for which a boresighting problem exists, see the copending patent application of Jack A. Crawford et al., Ser. No. 224,594, filed Sept. 12, 1962 and the copending patent application of Joseph S. Brugler, Ser. No. 703,228, filed Jan. 25, 1968.

One solution for boresighting the missile prior to launch had been to use an auxiliary cockpit joy stick to shift the tracking gate of the missile with respect to the line of flight of the aircraft. The joy stick concept, however, is basically a two-step operation: first lining up and trimming the aircraft, then placing attention on the cockpit monitor and moving the gyro with the auxiliary joy stick to find and "lock-on" to a target.

SUMMARY OF THE INVENTION

In accordance with the present invention, means for mechanically caging the gyros of a missile by electrically actuating disc brakes placed on the torquer motors are provided. In use, an aircraft takes off and at any time a suitable object becomes visible, the pilot uncages the gyros and "locks-on" to the object using the monitor. While "locked on" to the object, the pilot flies the aircraft until the fixed sight of the aircraft is exactly on the "lock-on" point, the pilot then cages the missile. This completes the boresighting of the guidance unit. In the vicinity of the target, the pilot makes his planned entry maneuver to place the fixed aircraft sight on the target. A brief glance at the monitor confirms or denies "lock-on." If the "lock-on" is good, the pilot fires the missile. If the "lock-on" is not good, a slight aircraft movement will place it in proper position, whereupon the missile may be released.

Thus a large time saving will occur because the critical boresighting alignment is done prior to the launch maneuver.

BRIEF DESCRIPTION OF THE DRAWING

FIG. 1 is a block diagram of the missile and tracking system;

FIG. 2 shows a pilot sighting a target through his aircraft gunsight while confirming lock-on with his cockpit video monitor; and FIG. 3 illustrates a use of the system of FIG. 1 in a guided missile launched from an attack aircraft.

DESCRIPTION OF THE PREFERRED EMBODIMENTS

FIG. 1 shows a television camera 19 mounted for movement in a horizontal plane about a vertical axis V and for movement in a vertical plane about a horizontal axis H. Torquer motors 12 and 16 continuously operate to aim camera 19 at a preselected target 27 in response to signals 11 and 15 received from tracking unit 10. Target 27 is selected by use of monitor display 26 which is operatively connected to tracking unit 10 by data link 25. The tracking unit receives target brightness information from output 20 of vidicon television camera 19. In order to synchronize the tracking unit with the deflection of the electronic beam scanning within the vidicon, horizontal deflection generator 21 and vertical deflection generator 23 emit horizontal synchronization pulses 22 and vertical synchronization pulses 24 which are fed into the tracking unit.

For a full explanation of a gyrostabilized television tracking system see the copending application of Joseph S. Brugler, Ser. No. 703,228, filed Jan. 25, 1968 and the patent application of Jack A. Crawford et al., Ser. No. 224,594, filed Sept. 12, 1962.

Before a television guided missile may be fired on target, both the aircraft and the missile must be "locked-on" to the target.

Referring to FIG. 2, the method of boresighting the missile will be explained. To boresight the weapon, the pilot locates some prominent terrain feature or other aircraft such as target aircraft 39. The pilot then places the target aircraft within the gated region as defined by cross hairs 29 on monitor 26 and the pilot "locks-on" to the target. While the television guided missile is tracking, pilot 30 maneuvers his aircraft by using joy stick 31 to place gunsight 28 on target 39. During the aircraft maneuver, button 33 on aircraft joy stick 31 is depressed to uncage the gyros. The guided missile is now capable of holding "lock-on" as the gunsight of the airplane is maneuvered over the target.

As shown in FIG 1, when button 33 is depressed the uncaging signal is sent via data link 34 to tracking unit 10 which in turn operates disc brakes 14 and 18 via data links 13 and 17 to uncage vertical and horizontal torquer motors 12 and 16, respectively. A brake which can be used for this purpose is fully disclosed in Navy Case No. 46844, Rotary Motion Brake by Earl J. Donaldson. The depressing of button 33 also sends a signal to the tracking unit via data link 35 which centers cross hairs 29 over a target on video monitor 26.

After the aircraft is maneuvered to place gunsight 28 on target 39, button 33 is released. The release of button 33 cages torquer motors 12 and 16 by releasing the electrical signal placed on brakes 14 and 18. The missile is now boresighted to the gunsight of the aircraft to whatever accuracy the pilot was able to achieve. When disc brakes 14 and 18 cage the torquer motors on the missile, the boresight is held.

To release the weapon, the following sequence may be used. Referring to FIG. 3, pilot 30, knowing that his weapon is boresighted, rolls in and places his gunsight on target 27. Pilot 30 looks at his cockpit video monitor 26 which shows the view of missile 37 via camera 19 of target 27. The pilot confirms that in fact the target is within the tracking gates and that "lock-on" has been achieved. If the target 27 is not within tracking gates 29 of cockpit video monitor 26, pilot 30 releases button 33 and maneuvers the aircraft a small amount to place the target within the tracking gates. Button 33 is now depressed and the sequence continued as before. The pilot depresses button 32, as shown in FIG. 2, to release the weapon. Confirmation of "lock-on" is important to insure that the weapon has not shifted on its bomb rack.

What is claimed is:

1. A method for aiming a gyrostabilized television guided missile system from the air at a ground target comprising:

aligning the "eye" of the television camera of the guided missile with the bombsight of the aircraft onto which it is placed;

mechanically caging the gyrostabilized platform on which the television camera is mounted, wherein said caging is responsive to electrical impulses;

flying the aircraft in straight and level flight;

sending the plane into a dive so that the bombsight of the aircraft is aimed at a preselected target;

checking the monitor in the cockpit of the aircraft to insure that the target is within the field-of-view of the missile;

making any correction necessary for bringing the target within the field-of-view of the missile by adjusting the flight path of the airplane; and releasing the missile at the target.

2. The method for aiming a gyrostabilized television guided missile system as claimed in claim 1, wherein aligning the "eye" of the television camera with the bombsight of the aircraft onto which it is placed is accomplished by:

locating some prominent terrain feature or another aircraft by the pilot;

placing the target within the field-of-view of the missile;

"locking-on" the missile to the target; and tracking the target by the missile while the aircraft is maneuvering to place the gunsight of the aircraft on the target.

* * * * *